US008681676B2

(12) United States Patent
Budampati et al.

(10) Patent No.: US 8,681,676 B2
(45) Date of Patent: Mar. 25, 2014

(54) SYSTEM AND METHOD FOR PROVIDING SIMULTANEOUS CONNECTIVITY BETWEEN DEVICES IN AN INDUSTRIAL CONTROL AND AUTOMATION OR OTHER SYSTEM

(75) Inventors: Ramakrishna S. Budampati, Maple Grove, MN (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1266 days.

(21) Appl. No.: 11/981,212

(22) Filed: Oct. 30, 2007

(65) Prior Publication Data

US 2009/0109889 A1    Apr. 30, 2009

(51) Int. Cl.
*H04H 20/71* (2008.01)
*H04L 12/28* (2006.01)

(52) U.S. Cl.
USPC .......................................... 370/312; 370/390

(58) Field of Classification Search
USPC .................................................. 370/312, 390
See application file for complete search history.

(56) References Cited

U.S. PATENT DOCUMENTS

| | | | |
|---|---|---|---|
| 5,396,537 A | 3/1995 | Schwendeman | |
| 5,537,414 A | 7/1996 | Takiyasu et al. | |
| 6,336,119 B1 * | 1/2002 | Banavar et al. | 1/1 |
| 6,381,215 B1 | 4/2002 | Hamilton et al. | |
| 6,421,570 B1 * | 7/2002 | McLaughlin et al. | 700/2 |
| 7,633,897 B2 * | 12/2009 | Bender et al. | 370/328 |
| 7,653,753 B2 * | 1/2010 | Chen et al. | 709/249 |
| 7,933,240 B2 | 4/2011 | Budampati et al. | |
| 8,271,657 B2 * | 9/2012 | Eastham | 709/227 |
| 8,397,065 B2 * | 3/2013 | Lin et al. | 713/162 |
| 8,547,906 B2 | 10/2013 | Budampati et al. | |
| 2002/0146008 A1 * | 10/2002 | Kaplan | 370/390 |
| 2003/0012215 A1 * | 1/2003 | Novaes | 370/432 |
| 2003/0109270 A1 | 6/2003 | Shorty | |
| 2003/0206535 A1 | 11/2003 | Shpak | |
| 2004/0259533 A1 * | 12/2004 | Nixon et al. | 455/414.1 |
| 2005/0013294 A1 | 1/2005 | Cypher | |
| 2005/0111416 A1 | 5/2005 | Ginzburg | |
| 2005/0117515 A1 | 6/2005 | Miyake | |
| 2005/0125502 A1 | 6/2005 | Fambon et al. | |
| 2005/0201349 A1 | 9/2005 | Budampati | |
| 2005/0281215 A1 | 12/2005 | Budampati et al. | |

(Continued)

OTHER PUBLICATIONS

Thomas L. Phinney, "Apparatus and Method for Acknowledging Successful Transmissions in a Wireless Communication System," U.S. Appl. No. 11/799,171, filed May 1, 2007.

(Continued)

*Primary Examiner* — Guang Li (57) ABSTRACT

A system, apparatuses, and methods support simultaneous connectivity between devices in an industrial control and automation or other system. For example, a data publisher can publish or provide data to multiple data subscribers. This can be done using a multicast group associated with the multiple data subscribers. The data publisher transmits a data message using a network address associated with the multicast group. Each data subscriber associated with the multicast group receives a copy of the data message. As a particular example, the data publisher could represent a wireless sensor or wireless actuator in the industrial control and automation or other system. Also, the data subscribers could represent multiple controllers or actuators in the industrial control and automation or other system. In this way, the multicasting functionality allows for simpler connectivity or interaction between devices in the industrial control and automation or other system.

20 Claims, 4 Drawing Sheets

(56) References Cited

U.S. PATENT DOCUMENTS

| | | |
|---|---|---|
| 2006/0002368 A1 | 1/2006 | Budampati et al. |
| 2006/0018319 A1* | 1/2006 | Palin et al. ............... 370/390 |
| 2006/0171344 A1 | 8/2006 | Subramanian et al. |
| 2006/0171346 A1 | 8/2006 | Kolavennu et al. |
| 2006/0178150 A1* | 8/2006 | Kim ............................ 455/445 |
| 2006/0227729 A1 | 10/2006 | Budampati et al. |
| 2006/0256740 A1 | 11/2006 | Koski |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0140241 A1* | 6/2007 | Asbun ......................... 370/390 |
| 2007/0155423 A1 | 7/2007 | Carmody et al. |
| 2007/0177594 A1* | 8/2007 | Kompella ..................... 370/390 |
| 2007/0183357 A1* | 8/2007 | Bender et al. ................ 370/328 |
| 2007/0217415 A1* | 9/2007 | Wijnands et al. ............. 370/390 |
| 2008/0075000 A1 | 3/2008 | Robbins |
| 2008/0144493 A1 | 6/2008 | Yeh |
| 2008/0238561 A1 | 10/2008 | Otsuka et al. |
| 2009/0049469 A1* | 2/2009 | Small et al. .................... 725/35 |

OTHER PUBLICATIONS

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

* cited by examiner

SYSTEM AND METHOD FOR PROVIDING SIMULTANEOUS CONNECTIVITY BETWEEN DEVICES IN AN INDUSTRIAL CONTROL AND AUTOMATION OR OTHER SYSTEM

TECHNICAL FIELD

This disclosure relates generally to industrial control and automation and other systems. More specifically, this disclosure relates to a system and method for providing simultaneous connectivity between devices in an industrial control and automation or other system.

BACKGROUND

Processing facilities are often managed using industrial control and automation systems. Example processing facilities include chemical, pharmaceutical, paper, and petrochemical production plants. Among other operations, industrial control and automation systems typically interact with and control industrial equipment in the processing facilities, such as equipment used to produce chemical, pharmaceutical, paper, or petrochemical products.

Industrial control and automation systems routinely include wired components and wireless components. For example, an industrial control and automation system could include a wireless network of sensors that provides data to a wired controller. Due to the unreliable nature of wireless communications, redundant connectivity and redundant message routing systems have been proposed. However, such systems are often difficult to integrate with wireless sensor networks and are often even more difficult to integrate with existing industrial control and automation systems.

SUMMARY

This disclosure provides a system and method for providing simultaneous connectivity between devices in an industrial control and automation or other system.

In a first embodiment, a method includes identifying a multicast network address associated with a multicast group, where the multicast group is associated with multiple data subscribers. The method also includes transmitting a data message from a data publisher using the multicast network address, where the data message traverses a path through a wireless network.

In a second embodiment, a method includes subscribing to a multicast group, where the multicast group has a multicast network address and is associated with a data publisher. The method also includes receiving a data message from the data publisher using the multicast network address, where the data message traverses a path through a wireless network.

In a third embodiment, a system includes a data publisher configured to identify a multicast network address associated with a multicast group and to transmit a data message using the multicast network address. The system also includes a wireless network configured to transport the data message. In addition, the system includes multiple data subscribers configured to receive the data message from the data publisher. The data publisher makes a single transmission of the data message to the multicast network address.

In a fourth embodiment, an apparatus includes a controller configured to identify a multicast network address associated with a multicast group, where the multicast group is associated with multiple data subscribers. The apparatus also includes a transceiver configured to transmit a data message through a wireless network using the multicast network address.

In a fifth embodiment, an apparatus includes a controller configured to subscribe to a multicast group, where the multicast group has a multicast network address and is associated with a data publisher. The apparatus also includes an interface configured to receive a data message from the data publisher using the multicast network address, where the data message traverses a path through a wireless network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
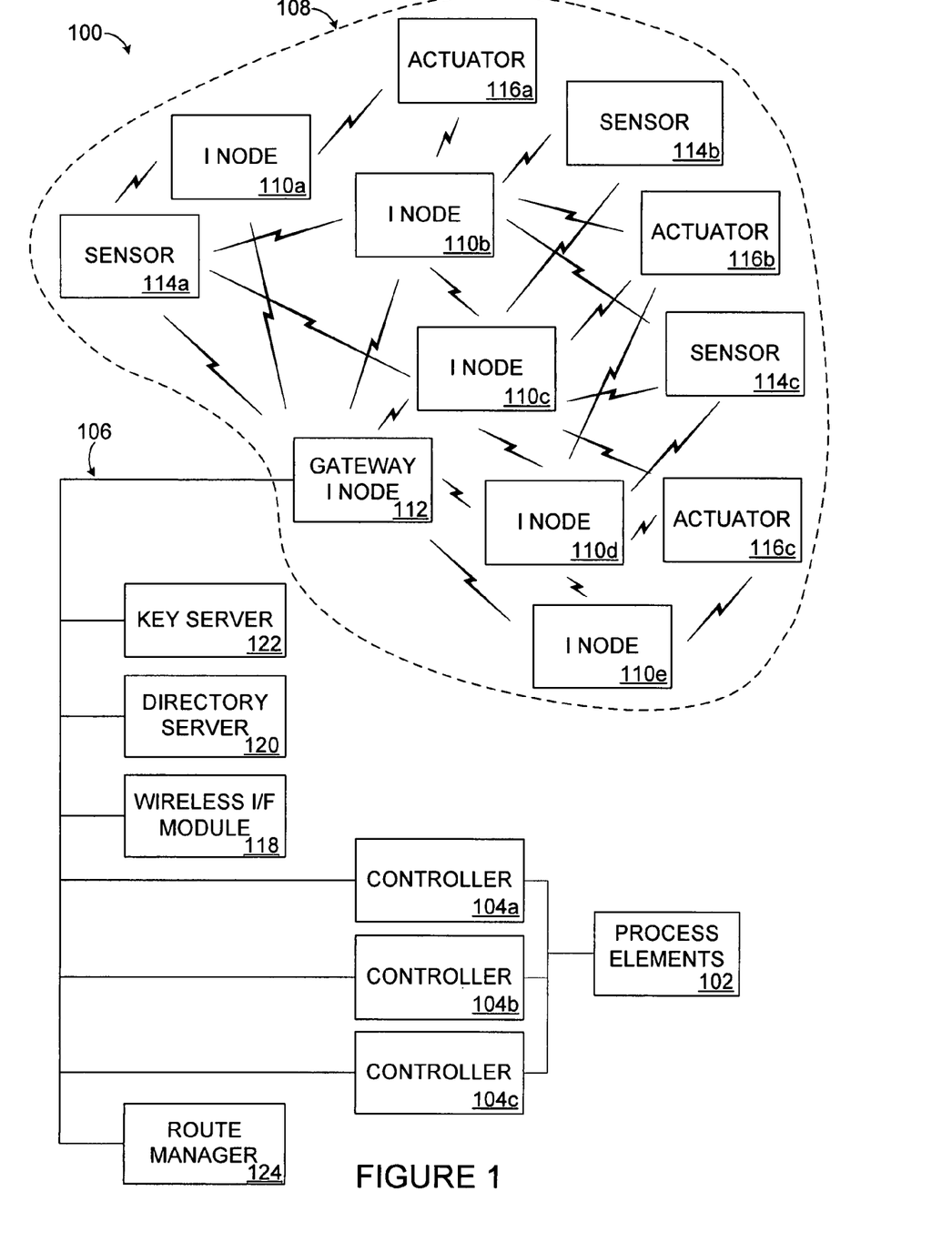
FIG. 1 illustrates an example industrial control and automation system according to this disclosure.

FIG. 1 illustrates an example industrial control and automation system 100 according to this disclosure. The embodiment of the system 100 shown in FIG. 1 is for illustration only. Other embodiments of the system 100 may be used without departing from the scope of this disclosure.

In this example embodiment, the system 100 includes one or more process elements 102. The process elements 102 represent components in a process or production system that may perform any of a wide variety of functions. For example, the process elements 102 could include sensors for measuring a wide variety of characteristics in the system 100, such as temperature, pressure, or flow rate. The process elements 102 could also include actuators that alter a wide variety of characteristics in the system 100, such as heaters, motors, catalytic crackers, or valves. Each of the process elements 102 includes any suitable structure for performing one or more functions in a processing or production system.

One or more controllers 104a-104c are coupled to the process elements 102. Each of the controllers 104a-104c controls the operation of one or more of the process elements 102. For example, each of the controllers 104a-104c could provide control signals to one or more actuators, thereby adjusting the operation of those actuators. Each of the controllers 104a-104c could also receive information from one or more sensors, such as by receiving sensor measurements of a flow rate of material through a pipe. The controllers 104a-104c could use this data to control one or more of the actuators, such as by controlling a valve using the measured flow rate. Each of the controllers 104a-104c includes any hardware, software, firmware, or combination thereof for controlling one or more process elements 102. Each of the controllers 104a-104c could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations.

As shown in FIG. 1, the industrial control and automation system 100 also includes one or more wireless networks. In this example, a wireless network 108 is formed using infrastructure nodes ("I nodes") 110a-110e, at least one gateway infrastructure node 112, and leaf nodes that include wireless sensors 114a-114c and wireless actuators 116a-116c (referred to collectively as "leaf nodes 114a-114c, 116a-116c").

The infrastructure nodes 110a-110e and leaf nodes 114a-114c, 116a-116c engage in wireless communications with each other. For example, the infrastructure nodes 110a-110e may receive data transmitted over the network 106 (via the gateway infrastructure node 112) and wirelessly communicate the data to the leaf nodes 114a-114c, 116a-116c. Similarly, the leaf nodes 114a-114c, 116a-116c may wirelessly communicate data to the infrastructure nodes 110a-110e for forwarding to the network 106 (via the gateway infrastructure node 112). In addition, the infrastructure nodes 110a-110e may wirelessly exchange data with one another. In this way, the nodes 110a-110e, 114a-114c, 116a-116c form part of a wireless network capable of providing wireless coverage to a specified area, such as in a large industrial complex.

In this example, the infrastructure nodes 110a-110e typically represent line-powered devices, meaning these nodes receive operating power from an external source. As a result, the infrastructure nodes 110a-110e are typically not limited in their operations since they need not minimize power consumption to increase the operational life of any internal power supplies. On the other hand, the leaf nodes 114a-114c, 116a-116c typically represent sensors, actuators, or other devices that receive operating power from internal batteries or other power supplies. Because of this, the leaf nodes 114a-114c, 116a-116c are often limited in their operations in order to help preserve the operational life of their internal power supplies. However, any other suitable nodes could be used in the wireless network 108.

Each of the infrastructure nodes 110a-110e and leaf nodes 114a-114c, 116a-116c includes any suitable structure facilitating wireless communications. Each of the nodes 110a-110e, 114a-114c, 116a-116c could also include or support other functionality, such as functionality for generating or using data communicated over the wireless network 108. As an example, the sensors 114a-114c could be used in an industrial facility to measure various characteristics within the facility. These sensors 114a-114c could collect readings and communicate the readings to the controllers 104a-104c via the gateway infrastructure node 112. The actuators 116a-116c could receive control signals from the controllers 104a-104c and adjust the operation of the industrial facility accordingly. In this way, the leaf nodes 114a-114c, 116a-116c may include or operate in a similar manner as the process elements 102 that are physically connected to the controllers 104a-104c.

The gateway infrastructure node 112 communicates wirelessly with, transmits data to, and receives data from one or more infrastructure nodes 110a-110e and possibly one or more leaf nodes 114a-114c, 116a-116c. The gateway infrastructure node 112 also converts data between the protocol(s) used by the network 106 and the protocol(s) used by the infrastructure nodes 110a-110e and leaf nodes 114a-114c, 116a-116c. For example, the gateway infrastructure node 112 could convert Ethernet-formatted data (transported over the network 106) into a wireless protocol format (such as the IEEE 802.11a, 802.11b, 802.11g, 802.11n, 802.15.3, 802.15.4, or 802.16 protocol format) used by the nodes 110a-110e, 114a-114c, 116a-116c. The gateway infrastructure node 112 could also convert data received from one or more of the infrastructure nodes 110a-110e and leaf nodes 114a-114c, 116a-116c into Ethernet-formatted data for transmission over the network 106. In addition, the gateway infrastructure node 112 may support various functions, such as network creation and security, used to create and maintain the wireless network 108. The gateway infrastructure node 112 includes any suitable structure for facilitating communication between components or networks using different protocols.

In this example, the industrial control and automation system 100 also includes a wireless interface module 118. The wireless interface module 118 communicates with the gateway infrastructure node 112, helping to facilitate the use of the wireless network 108 in the industrial control and automation system 100. For example, various wired components in the industrial control and automation system 100 could transmit data to the wireless interface module 118, which could then provide the data to the appropriate gateway infrastructure node 112 for communication to specified leaf nodes 114a-114c, 116a-116c. The gateway infrastructure node 112 could also provide data received from the leaf nodes 114a-114c, 116a-116c to the wireless interface module 118, which could then provide the data to the appropriate wired destination. The wireless interface module 118 includes any hardware, software, firmware, or combination thereof for supporting the use of a wireless network in an industrial control and automation system. Additional details regarding the wireless interface module 118 are provided in U.S. patent application Ser. No. 11/888,090 filed on Jul. 31, 2007, which is hereby incorporated by reference. Although shown as separate from the gateway infrastructure node 112, the wireless interface module 118 could be combined with the gateway infrastructure node 112 in a single physical device.

The industrial control and automation system 100 further includes a directory server 120. The directory server 120 generally supports the use of multicasting in the system 100, which may involve transmitting data to multiple destinations. For example, the directory server 120 may assign a network address or a series of network addresses to a multicast group, which could represent a collection of various controllers, leaf nodes, or other devices. When a device wishes to provide information in the system 100, the device could use a network address associated with a multicast group to multicast the information to all of the devices associated with the multicast group. The directory server 120 includes any hardware, software, firmware, or combination thereof for facilitating the identification and use of multicast groups.

In addition, the industrial control and automation system 100 includes a key server 122. The key server 122 supports security in the industrial control and automation system 100. For example, the key server 122 could distribute cryptographic keys or other security data to various components in the industrial control and automation system 100, such as to the nodes 110a-110e, 112, 114a-114c, and 116a-116c. The key server 122 includes any hardware, software, firmware, or combination thereof for providing cryptographic keys or other security information to various nodes in the industrial control and automation system 100.

In conventional systems, there is typically a one-to-one relationship between sensors and controllers. For example, in conventional process control systems, each sensor is often connected to a single controller, and all communications involving that sensor occur with that single controller. However, the sensor may need to communicate with a second controller, such as when the sensor is a multi-parameter device that has to report certain parameters to a different controller. In these cases, the sensor can send a message to its connected controller, which then sends the message to the second controller. This requires communication capability between the two controllers, which adds complexity and cost to the system. The sensor could also use a separate connection with the second controller, which requires additional wiring between the sensor and the second controller.

In accordance with this disclosure, the wireless network 108 and its associated devices support multicasting functionality that allows for simpler connectivity or interaction between devices. For example, each of the sensors 114a-114c could transmit measurement data to multiple controllers 104a-104c or other devices using a multicast group. Similarly, a controller can provide data to multiple sensors 114a-114c, actuators 116a-116c, or other devices using a multicast group. Further, through the use of multicast groups, a controller can request data from any number of sensors 114a-114c or other devices, and sensors can provide data to multiple controllers or other devices.

In this document, the term "subscriber" and its derivatives refer to controllers, actuators, or other devices that wish to receive data from a data source (such as a sensor). Also, the term "publisher" and its derivatives may refer to sensors, actuators, or other devices that provide data to subscribers. A device can become a subscriber by joining a particular multicast group supported in the system 100. For example, if a new controller is added to the system 100, the controller can be configured to receive data from the appropriate sensors 114a-114c by joining a multicast group used by the sensors 114a-114c to broadcast measurement data. Also, a device can become a publisher by providing data to a multicast group supported in the system 100. It should be noted that a device can be both a publisher and a subscriber.

In this way, the system 100 can easily support configurable and reconfigurable communications between subscribers and publishers of data. This may allow for more easily implemented control strategies in the system 100. For example, this technique may be useful for providing communications between two different control areas, such as adjacent unit operations facilities in a plant that run in different control rooms. As a particular example, a raw materials preparation unit could use a composition sensor for feedback to ensure the quality of a raw material. The same sensor could also be used as a feed-forward sensor to signal significant changes in raw material grade for a distillation tower in a downstream process. This can be done by allowing the sensor to publish its sensor data to a multicast group, which includes components in both the raw materials preparation unit and the distillation tower.

In these embodiments, the directory server 120 may support the creation and maintenance of multicast groups, such as by allowing devices to join and leave a multicast group. This can be done based on user input or automatically. The directory server 120 can also assign network addresses to the multicast groups, which are used by publishers to publish data to the subscribers. In addition, the key server 122 may assign separate session keys for "conversations" (transmissions) of data in a multicast group.

In particular embodiments, metrics can be used to control the multicasting of data packets or other messages in the system 100. For example, minimum hop, minimum latency, and load balancing requirements can be supported in the system 100. Instead of or in addition to this, routes can be selected for a multicast message so that the message has a maximum number of common hops en route to the destinations (subscribers) receiving the message. This may reduce the number of duplicate messages transported through the wireless network 108 to the subscribers. The routes for a multicast message can be determined at a central location, such as a route manager 124 (which may include any hardware, software, firmware, or combination thereof for identifying and selecting message routes in a system). The routes could also be determined in a decentralized manner, such as by using a route-request from a subscriber and a route calculation by a publisher. In addition, a multicast message could contain or identify a route, or a publisher can identify the next hop in a chain of intermediate hops to the destinations.

Among other things, this technique provides for simultaneous connectivity between devices. For example, it may allow each of the leaf nodes 114a-114c, 116a-116c in the system 100 to communicate with multiple ones of the controllers 104a-104c using a single transmission. In this way, the multicast groups may help to ensure that, for example, any of the leaf nodes 114a-114c, 116a-116c can communicate with any of the controllers 104a-104c using an existing infrastructure. Also, the controllers 104a-104c could easily communicate with one another, or any other suitable communications could occur in the system 100.

Although FIG. 1 illustrates one example of an industrial control and automation system 100, various changes may be made to FIG. 1. For example, the system 100 could include any number of process elements, controllers, networks (wired or wireless), infrastructure nodes (gateway or other), leaf nodes, wireless interface modules, directory servers, key servers, and route managers. Also, the functional division shown in FIG. 1 is for illustration only. Various components in FIG. 1 could be combined or omitted and additional components could be added according to particular needs. Further, while described as supporting one wireless network 108, the system 100 could support any number of wireless networks. Beyond that, the communication paths and system layout in FIG. 1 are for illustration only and can be changed depending on the implementation. As a particular example, the leaf nodes in FIG. 1 could communicate with each other or with any other arrangement of infrastructure nodes. In addition, FIG. 1 illustrates one operational environment in which data subscribing and data publishing functionality could be used in a control system. This functionality could be used in any other suitable process control or non-process control system or environment. As a particular example, this functionality could also be used in a building control system, such as when a wireless room occupancy sensor is a publisher and a light controller (for turning on/off lights in a room) and an HVAC controller (for turning on/off air conditioning, heating, and fans in a room) are subscribers.

Figure 2:
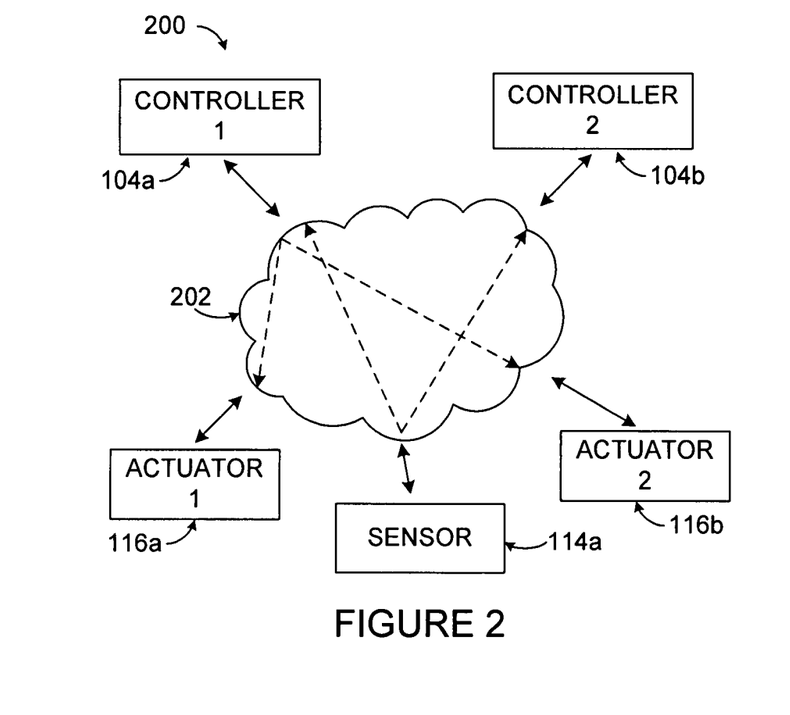
FIG. 2 illustrates an example technique for providing simultaneous connectivity between devices in an industrial control and automation or other system according to this disclosure.

FIG. 2 illustrates an example technique 200 for providing simultaneous connectivity between devices in an industrial control and automation or other system according to this disclosure. The embodiment of the technique 200 shown in FIG. 2 is for illustration only. Other techniques could be used without departing from the scope of this disclosure. Also, for ease of explanation, the technique 200 shown in FIG. 2 is described with respect to the system 100 of FIG. 1. The technique 200 in FIG. 2 could be used with any suitable process control or non-process control system.

In this example, one sensor 114a, two actuators 116a-116b, and two controllers 104a-104b are shown communicating via a mesh network 202. The mesh network 202 could, for example, be formed from the various nodes 110a-110e and 112 (and possibly 114a-114c and 116a-116c) in FIG. 1. As described above, components can be referred to as publishers and subscribers. Publishers generally provide data to subscribers via the use of multicast groups. For instance, a publisher can transmit data using the network address of a multicast group, and any device that has subscribed (joined) the multicast group could receive the data.

Through the use of this publication and subscription mechanism, components in a system can be easily configured to provide data to or receive data from other components in the system. For example, the controller 104a could be configured to provide data to multiple actuators 116a-116b using a first multicast address (where a single transmission is needed from the controller 104a). As another example, the sensor 114a could be configured to publish data to multiple controllers 104a-104b using a second multicast address (where a single transmission is needed from the sensor 114a). The mesh network 202 can easily support any number of multicast addresses that allow components to publish data to and subscribe to receive data from other components in various ways. Again, it may be noted that a single component can be both a publisher and a subscriber, such as when a controller subscribes to receive measurement data from a sensor and publishes control data to an actuator.

Although FIG. 2 illustrates one example of a technique 200 for providing simultaneous connectivity between devices in an industrial control and automation or other system, various changes may be made to FIG. 2. For example, the simultaneous connectivity between devices could involve any suitable number and type of devices and involve the communication of any suitable data between devices.

Figure 3:
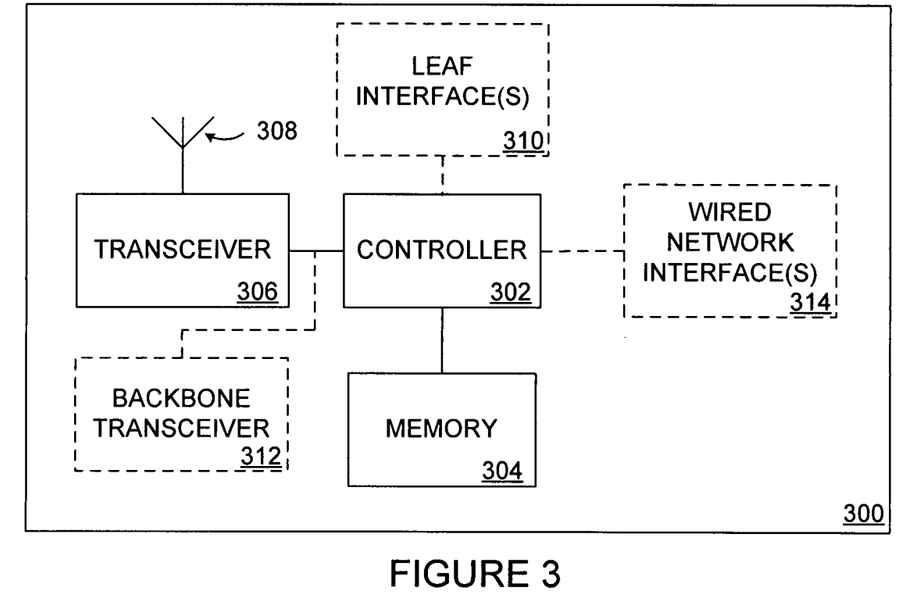
FIG. 3 illustrates an example device supporting simultaneous connectivity in an industrial control and automation or other system according to this disclosure.

FIG. 3 illustrates an example device 300 supporting simultaneous connectivity in an industrial control and automation or other system according to this disclosure. The embodiment of the device 300 shown in FIG. 3 is for illustration only. Other embodiments of the device 300 could be used without departing from the scope of this disclosure.

The device 300 is used here to generally represent any of the various devices in the wireless network 108. In this example, the device 300 includes a controller 302, a memory 304, a transceiver 306, and an antenna 308. The controller 302 generally represents any suitable structure for controlling the device 300, such as a microprocessor, microcontroller, application specific integrated circuit (ASIC), or other structure. The memory 304 generally represents any suitable storage and retrieval device or devices, such as a random access memory or read-only memory. The transceiver 306 generally represents any suitable structure for supporting the transmission and reception of wireless signals via the antenna 308, such as a radio frequency (RF) transceiver. The antenna 308 generally represents any suitable structure for transmitting and receiving wireless signals, such as an RF antenna.

The contents of the memory 304 and the operation of the other components in the device 300 may vary depending on whether the device 300 represents a leaf node, an infrastructure node, a gateway infrastructure node, or other device. In a leaf node, the controller 302 could be configured to take sensor measurements, implement actuator control signals, or otherwise perform functions associated with a leaf node. The controller 302 could also be configured to publish data to various subscribers by broadcasting information (via the transceiver 306 and antenna 308) to one or more multicast groups. Information about the multicast groups could be stored in the memory 304. If the device 300 is implemented separately from a sensor or actuator, the device 300 could also include at least one leaf interface 310, which could act as an interface to a sensor, actuator, or other external device.

In an infrastructure node or a gateway infrastructure node, the controller 302 may be generally responsible for routing data to appropriate destinations. For example, an infrastructure node may include a backbone transceiver 312 (and possibly another antenna) used to communicate with other infrastructure nodes or gateway infrastructure nodes. The controller 302 in the infrastructure node may therefore be used to route data received through the transceiver 312 to the transceiver 306 (and vice versa) to support wireless communications between, for example, leaf nodes and the other infrastructure nodes/gateway infrastructure nodes. The controller 302 may also support the routing of multicast group messages to appropriate destinations, such as by using routes identified by the route manager 124 or contained in the multicast group messages to route received messages.

Similarly, a gateway infrastructure node may include the backbone transceiver 312 and at least one wired network interface 314. The wired network interface 314 allows the gateway infrastructure node to communicate over at least one wired network, such as the network 106 in FIG. 1. The wired network interface 314 could represent any suitable structure facilitating communication over a wired network, such as an Ethernet interface. Here, the controller 302 could perform routing functions to route messages between the transceiver 306, transceiver 312, and network interface 314. The controller 302 could also perform functions for translating between different protocols, such as wireless network protocols and wired network protocols. The controller 302 may further support the routing of multicast group messages to appropriate destinations, such as by using routes identified by the route manager 124 or contained in the multicast group messages to route received messages.

Although FIG. 3 illustrates one example of a device 300 supporting simultaneous connectivity in an industrial control and automation or other system, various changes may be made to FIG. 3. For example, various components in FIG. 3 could be combined or omitted or additional components could be added according to particular needs.

Figure 4:
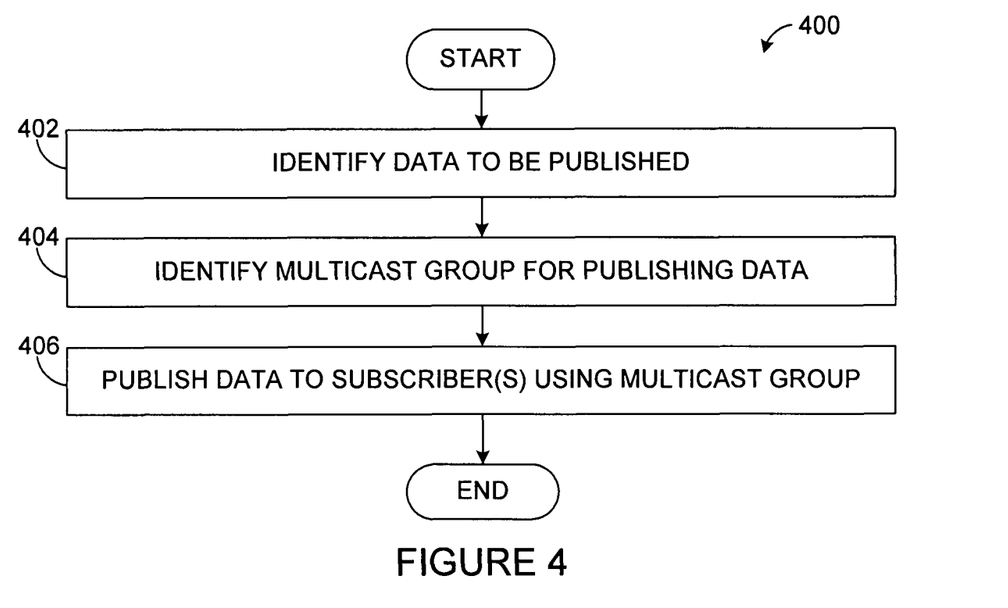
FIG. 4 illustrates an example method for data publication to support simultaneous connectivity between devices in an industrial control and automation or other system according to this disclosure.

FIG. 4 illustrates an example method 400 for data publication to support simultaneous connectivity between devices in an industrial control and automation or other system according to this disclosure. The embodiment of the method 400 shown in FIG. 4 is for illustration only. Other embodiments of the method 400 may be used without departing from the scope of this disclosure.

A publishing device identifies data to be transmitted at step 402. This could include, for example, a leaf node (such as a sensor 114a-114c) identifying sensor data to be transmitted to one or more controllers or other subscribing devices. This could also include a leaf node (such as an actuator 116a-116c) identifying actuator data to be transmitted to one or more controllers or other subscribing devices.

The publishing device identifies a multicast group for publishing the data at step 404. This could include, for example, a sensor 114a-114c identifying a particular network address for use in transmitting the sensor data. This could also include an actuator 116a-116c identifying a particular network address for use in transmitting the actuator data.

The data is then published to one or more subscribing devices using the multicast group at step 406. This could include, for example, a sensor 114a-114c broadcasting a data message containing the sensor data and the network address for the appropriate multicast group. This could also include an actuator 116a-116c broadcasting a data message containing the actuator data and the network address for the appropriate multicast group. The intermediate node(s) between the publishing device and the subscribing device(s) may use routes identified in the data message, routes identified by the route manager 124, routes identified by the publishing device, or other routes to send the data message to the appropriate subscriber(s).

Although FIG. 4 illustrates one example of a method 400 for data publication to support simultaneous connectivity between devices in an industrial control and automation or other system, various changes may be made to FIG. 4. For example, while described with respect to a leaf node, the method 400 could be used by any component publishing data for one or more subscribers.

Figure 5:
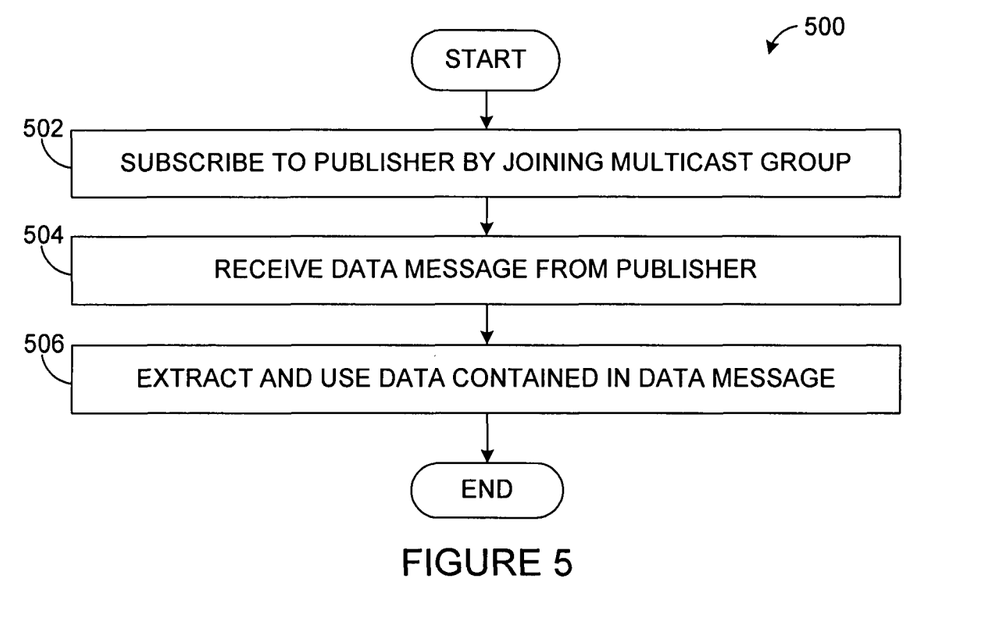
FIG. 5 illustrates an example method for data subscription to support simultaneous connectivity between devices in an industrial control and automation or other system according to this disclosure.

FIG. 5 illustrates an example method 500 for data subscription to support simultaneous connectivity between devices in an industrial control and automation or other system according to this disclosure. The embodiment of the method 500 shown in FIG. 5 is for illustration only. Other embodiments of the method 500 may be used without departing from the scope of this disclosure.

A subscribing device subscribes to a particular publisher by joining a multicast group at step 502. This could include, for example, a controller 104a-104c transmitting a request to be added to a multicast group to the directory server 122. The request could take any suitable form, such as by identifying a particular publishing device and the desired data. The directory server 122 could then identify the multicast group associated with the publishing device and the desired data and add the controller 104a-104c to the group. The directory server 122 could also create a new multicast group and add the controller 104a-104c to the new group. This could also be done manually, such as by a user accessing the directory server 122.

At some point, the subscribing device receives a data message from the publisher at step 504. This could include, for example, the controller 104a-104c receiving a data message from a sensor or actuator, where the sensor or actuator transmitted the data using a network address of the multicast group.

The subscribing device may extract and use the data contained in the data message at step 506. This could include, for example, the controller 104a-104c extracting sensor measurements from the data message and using the measurements to generate control signals for an actuator. The controller 104a-104c could then publish the control signals to one or more actuators for implementation, such as by using the publication method 400 in FIG. 4.

Although FIG. 5 illustrates one example of a method 500 for data subscription to support simultaneous connectivity between devices in an industrial control and automation or other system, various changes may be made to FIG. 5. For example, while described with respect to a controller, the method 500 could be used by any component subscribing to receive data from one or more publishers.

Figure 6:
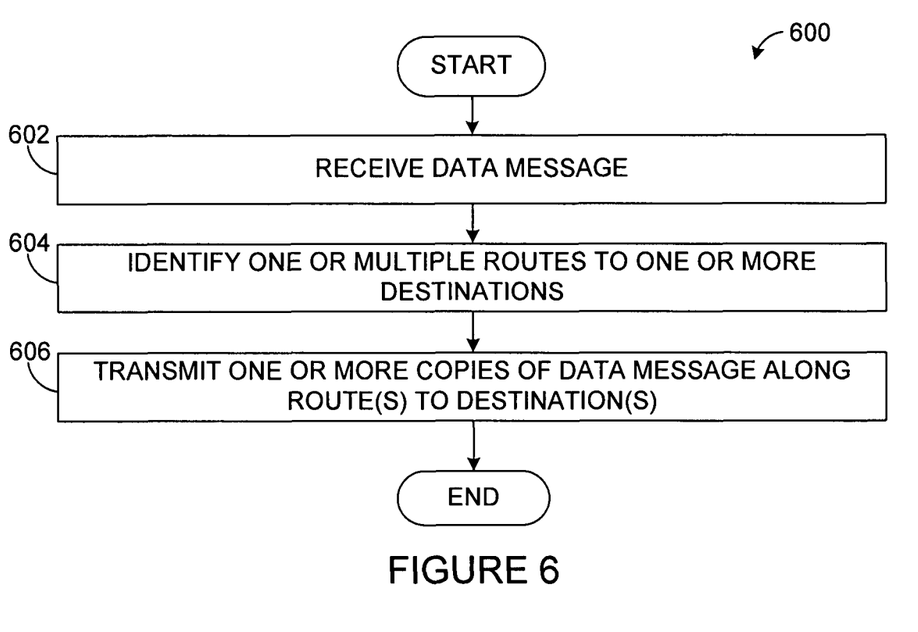
FIG. 6 illustrates an example method for routing data to support simultaneous connectivity between devices in an industrial control and automation or other system according to this disclosure.

FIG. 6 illustrates an example method 600 for routing data to support simultaneous connectivity between devices in an industrial control and automation or other system according to this disclosure. The embodiment of the method 600 shown in FIG. 6 is for illustration only. Other embodiments of the method 600 may be used without departing from the scope of this disclosure.

A node associated with a wireless network receives a data message at step 602. This could include, for example, an infrastructure node, gateway infrastructure node, or wireless interface module receiving a data message from one of the sensors 114a-114c, actuators 116a-116c, or controllers 104a-104c. The message could be received directly or indirectly from the sensor, actuator, or controller, such as via one or more other nodes associated with the wireless network.

The node identifies one or multiple paths to one or multiple destinations at step 604. This could include, for example, the infrastructure node, gateway infrastructure node, or wireless interface module identifying a multicast group address associated with the received message. This could also include the infrastructure node, gateway infrastructure node, or wireless interface module identifying a route to the one or more subscribers associated with the multicast group. The routes could be identified in the data message, identified by the route manager 124, identified by the publisher, or identified in any other suitable manner.

The node communicates one or more copies of the data message along the identified route(s) to the subscriber(s) at step 606. This could include, for example, the infrastructure node, gateway infrastructure node, or wireless interface module transmitting one or multiple copies of the data message directly or indirectly to one or more destinations, such as to one or more sensors, actuators, controllers, or other wireless network nodes (such as another infrastructure node or gateway infrastructure node).

Although FIG. 6 illustrates one example of a method 600 for routing data to support simultaneous connectivity between devices in an industrial control and automation or other system, various changes may be made to FIG. 6. For example, while described with respect to an infrastructure node, gateway infrastructure node, or wireless interface module, the method 600 could be used by any intermediate component between a publishing device and a subscribing device.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A method comprising:
   identifying a multicast network address associated with a multicast group, the multicast group associated with multiple data subscribers in an industrial control and automation system; and
   transmitting a data message from a data publisher using the multicast network address, the data message traversing at least one path through a wireless network, the data publisher comprising a wireless sensor configured to measure a characteristic in the industrial control and automation system or a wireless actuator configured to alter a characteristic in the industrial control and automation system;
   wherein the data subscribers comprise at least one of:
      one or more controllers configured to control operation of one or more process elements; and
      one or more actuators configured to receive one or more control signals from the one or more controllers for adjustment to one or more operations of the one or more actuators; and
   wherein the data publisher is a data subscriber of a second multicast group.

2. The method of claim 1, further comprising:
   assigning a session key for the data message.

3. The method of claim 1, further comprising:
   identifying at least one route for the data message through the wireless network.

4. The method of claim 3, wherein identifying the at least one route comprises identifying multiple routes through the wireless network such that a common number of hops along the multiple routes between the data publisher and the data subscribers is maximized.

5. The method of claim 1, further comprising:
   subscribing to a second multicast network address associated with the second multicast group; and
   receiving a second data message from a second data publisher using the second multicast network address.

6. A method comprising:
   subscribing to a multicast group, the multicast group having a multicast network address and associated with a data publisher, the data publisher comprising a wireless sensor configured to measure a characteristic in an industrial control and automation system or a wireless actuator configured to alter a characteristic in the industrial control and automation system; and
   receiving a data message from the data publisher using the multicast network address, the data message traversing at least one path through a wireless network;
   wherein the subscribing and receiving occur at one or more of:
      one or more controllers configured to control operation of one or more process elements; and
      one or more actuators configured to receive one or more control signals from the one or more controllers for adjustment to one or more operations of the one or more actuators; and
   wherein the data publisher is a data subscriber of a second multicast group.

7. The method of claim 6, further comprising:
   identifying multiple routes through the wireless network such that a common number of hops along the multiple routes between the data publisher and multiple data subscribers is maximized.

8. The method of claim 6, further comprising:
   identifying a second multicast network address associated with the second multicast group; and
   transmitting a second data message using the second multicast network address to multiple data subscribers.

9. A system comprising:
   a data publisher configured to identify a multicast network address associated with a multicast group and to transmit a data message using the multicast network address, the data publisher comprising a wireless sensor configured to measure a characteristic in an industrial control and automation system or a wireless actuator configured to alter a characteristic in the industrial control and automation system;
   a wireless network configured to transport the data message; and
   multiple data subscribers in the industrial control and automation system, the data subscribers configured to receive the data message from the data publisher, the data publisher configured to make a single transmission of the data message to the multicast network address;
   wherein the data subscribers comprise at least one of:
   one or more controllers configured to control operation of one or more process elements; and
   one or more actuators configured to receive one or more control signals from the one or more controllers for adjustment to one or more operations of the one or more actuators; and
   wherein the data publisher is a data subscriber of a second multicast group.

10. The system of claim 9, further comprising:
    a directory server configured to maintain multiple multicast network addresses for multiple multicast groups.

11. The system of claim 9, further comprising:
    a route manager configured to identify at least one route for the data message through the wireless network.

12. The system of claim 11, wherein the route manager is configured to identify multiple routes through the wireless network such that a common number of hops along the multiple routes between the data publisher and the data subscribers is maximized.

13. An apparatus comprising:
a controller configured to identify a multicast network address associated with a multicast group, the multicast group associated with multiple data subscribers in an industrial control and automation system; and
a transceiver configured to transmit a data message through a wireless network using the multicast network address;
wherein the apparatus comprises a wireless sensor configured to measure a characteristic in the industrial control and automation system or a wireless actuator configured to alter a characteristic in the industrial control and automation system;
wherein the data subscribers comprise at least one of:
one or more process controllers configured to control operation of one or more process elements; and
one or more actuators configured to receive one or more control signals from the one or more process controllers for adjustment to one or more operations of the one or more actuators; and
wherein the controller is a data subscriber of a second multicast group.

14. The apparatus of claim 13, wherein the controller is further configured to identify at least one route for the data message through the wireless network.

15. The apparatus of claim 14, wherein the controller is configured to identify multiple routes through the wireless network such that a common number of hops along the multiple routes between the apparatus and the data subscribers is maximized.

16. The apparatus of claim 13, wherein:
the controller is further configured to subscribe to a second multicast network address associated with the second multicast group; and
the transceiver is further configured to receive a second data message from a data publisher using the second multicast network address.

17. An apparatus comprising:
a controller configured to subscribe to a multicast group, the multicast group having a multicast network address and associated with a data publisher, the controller configured to control operation of one or more process elements, the data publisher comprising a wireless sensor configured to measure a characteristic in an industrial control and automation system or a wireless actuator configured to alter a characteristic in the industrial control and automation system; and
an interface configured to receive a data message from the data publisher using the multicast network address, the data message traversing at least one path through a wireless network; and
wherein the data publisher is a data subscriber of a second multicast group;
wherein the data subscribers comprise at least one of:
one or more process controllers configured to control operation of one or more process elements; and
one or more actuators configured to receive a control signal from the one or more process controllers for adjustment to one or more operations of the one or more actuators; and
wherein the controller is a data subscriber of a second multicast group.

18. The apparatus of claim 17, wherein the controller is further configured to identify at least one route through the wireless network.

19. The apparatus of claim 18, wherein the controller is configured to identify multiple routes through the wireless network such that a common number of hops along the multiple routes between the data publisher and multiple data subscribers is maximized, the multiple data subscribers including the apparatus.

20. The apparatus of claim 17, wherein:
the controller is further configured to identify a second multicast network address associated with the second multicast group; and
the interface is further configured to transmit a second data message using the second multicast network address to multiple data subscribers.

* * * * *